United States Patent [19]

Psaltopoulos

[11] Patent Number: 4,878,624

[45] Date of Patent: Nov. 7, 1989

[54] PROCESS FOR CONDITIONING LIQUID PETROLEUM

[75] Inventor: Emmanuel Psaltopoulos, Belmont, Mass.

[73] Assignee: Hydro Energy Systems, Ltd., Douglas, Isle of Man

[21] Appl. No.: 310,329

[22] Filed: Feb. 13, 1989

Related U.S. Application Data

[62] Division of Ser. No. 777,963, Sep. 19, 1985, Pat. No. 4,826,089.

[51] Int. Cl.$^4$ .............................................. B02C 19/12
[52] U.S. Cl. .......................................... 241/29; 241/21
[58] Field of Search ....................... 241/21, 29, 30, 40, 241/45, 95, 152 R, 152 A, 163, 274, 260.1; 366/336, 337, 338, 325, 327, 329, 330

[56] References Cited

U.S. PATENT DOCUMENTS

| | | | |
|---|---|---|---|
| 1,959,712 | 5/1934 | Flowers | 366/330 X |
| 2,972,473 | 2/1961 | Heller | 241/163 X |
| 3,059,862 | 10/1962 | Rich | 241/152 R |
| 3,147,958 | 9/1964 | Stiffler | 366/327 |
| 3,203,371 | 8/1965 | Mosey | 366/336 X |
| 3,279,894 | 10/1966 | Tate et al. | 366/330 X |
| 3,923,288 | 12/1975 | King | 366/376 |
| 4,004,786 | 1/1977 | Stephens | 366/327 |
| 4,258,782 | 3/1981 | Kao | 366/338 X |
| 4,344,580 | 8/1982 | Hoshall et al. | 241/260.1 X |

Primary Examiner—Joseph M. Gorski

[57] ABSTRACT

A process for reducing the size of asphaltene particles in heavy fuel oils, rendering the fuel oils more suitable for clean combustion. The process includes the steps of passing the fuel oil through a plurality of zones within a conduit, with each zone having shearing elements.

11 Claims, 2 Drawing Sheets

PROCESS FOR CONDITIONING LIQUID PETROLEUM

CROSS-REFERENCE TO RELATED APPLICATION

This is a division of application Ser. No. 06/777,963, filed Sept. 19, 1985 in the name of Emmanuel Psaltopoulos and now U.S. Pat. No. 4,826,089.

BACKGROUND OF THE INVENTION

1. Field of the Invention

This invention relates to the treatment of fuel oils, and is directed more particularly to the reduction is size of asphaltene particles in fuel oils, so as to render the fuel oils more suitable for clean combustion.

2. Description of the Prior Art

U.S. Pat. No. 4,109,318 to Hutchins discloses an in-line blender having blades of graduated configuration placed along a central shaft of a flow conduit. The blades form continuous spiral mixing channels which extend well into the center of the conduit. U.S. Pat. No. 4,123,178 to Salzman, et al, discloses a similar in-line blender. In each of the above patents, a number of blades are mounted on a central shaft to impart a general swirl-type motion to a liquid travelling therethrough. Reversal of the direction of swirl is recognized as a mixing expedient.

Numerous other static devices are disclosed in the art as contributing some desirable property to a liquid flowing therethrough. See, for example, U.S. Pat. Nos. 4,441,823; 3,582,048; 4,427,030, and the like.

U.S. Pat. No. 4,479,805 to Batra discloses pumping of an asphaltene-bearing oil through a perforated pipe to reduce the particle size of the asphaltene, particularly when the asphaltene is carried in water-oil emulsions. Notwithstanding the process of Batra, it has been found that the variety of asphaltene in oil renders still further improvements in asphaltene conditioning desirable, in order to reduce particulate emissions from stack gas.

An additional aspect of the commercial background of the invention is the fact that heavy fuel oils have had varying and increasing amounts of asphaltene therein, and the quantity and quality of asphaltene can vary considerably from shipment to shipment.

SUMMARY OF THE INVENTION

It is a principle object of the invention to provide an improved process for reducing the size of asphaltene particles in heavy fuel oils, thereby rendering the oil more suitable for clean combustion.

A further object of the invention is to provide a one-pass process for treating asphaltene-bearing fuel oils to reduce the size of asphaltene particles.

A still further object of the invention is to provide a process which may be varied quickly and inexpensively to meet the requirement of a specific shearing problem presented by various heavy fuel carrying asphaltene of different characteristics.

Other objects of the invention will be obvious to those skilled in the art.

The above objects have been achieved by providing a fluid processing apparatus comprising a conduit, the flow path of which is obstructed with stationary blades having shearing edges designed to cause intensive shearing of the liquid being processed. It is advantageous that the apparatus have a substantial mixing characteristic to assure that all liquid is treated during passage through the apparatus. The blades that carry the shearing edges also act as mixing means.

In the preferred embodiment of the invention, the shearing edges are carried on blades which comprise portions of blade-bearing elements. The elements are closely-packed to form arrays. Arrays of the blade-bearing elements are spaced at short distances from one another to assure shearing and mixing, and to insure that substantially all of the liquid is processed by the blades. The inner wall of the conduit, in which the blades are disposed, is sufficiently close to the outer periphery of the blades to prevent substantial flow in any manner other than in helix-like paths formed by the blade-bearing elements.

The desired comminuting action can be achieved in a relatively short length of conduit and in a single pass, a major advance over the shear-processing of asphaltene heretofore known to the art. In most advantageous embodiments of the invention, the shearing arrays are divided into a variety of processing zones.

A flow orientation zone provides a swirl motion to the liquid. This zone includes blade-bearing shearing elements and is, therefore, generally less effective in comminuting asphaltenes than are the more compact particle-shear zones, to be described below. Typically, there are about 1.5 to 3 swirls (i.e. 360° helical turns) initiated per inch of length of the flow-orientation zone when a 1-inch diameter conduit is used.

A particle shear zone is a relatively compact arrangement of blade-bearing shearing elements, typically with about 3 to about 6 helical "swirls" initiated per inch in a 1-inch diameter conduit.

Still another type shear zone is a baffled shear zone which provides a baffled swirl flow path. In accordance with the invention, the centerline of the flow path in a baffled shear zone is generally helical, but follows a zig-zag pattern. The spacing of the swirl flow paths is about the same as in the particle shear zone. However, the baffled shear zone serves as an effective particle shearing device and further, contributes more pressure drop to the system than do the other zones.

It is advantageous, but not necessary, to have spaces between the above-described zones, along the flow path, which can be utilized to facilitate change in flow patterns from zone to zone. In such spaces, it is often desirable to have conduit baffling, such as narrowing means, to direct the liquid inwardly toward the shearing elements to avoid any undesirable bypassing of the shearing elements.

The flow configurations used to achieve the asphaltene comminuting action are desirably formed of blade-bearing elements which, when mounted adjacent to one another on a shaft, leave small gaps between blades, simulating small V-shaped slits in a one-piece helical element. In addition to the slits, it has been found helpful to have the blades sufficiently irregular (inherent in a stamping process of manufacture for blades as shown) to insure that the blade surfaces are somewhat irregularly offset from one another along what would otherwise be an idealized helical flow path. This offset condition is inherent, and relatively severe, particularly in the baffled shear zone swirl flow path.

A typical asphaltene shearing application according to the invention utilizes a series of elements mounted in parallel one with the other, each one adapted to handle a portion only of the total flow of petroleum product. Depending on the design parameters of a given facility, several arrays of elements may be utilized to condition fuel.

One of the problems with conditioning asphaltene bearing oils, such as No. 6 and No. 10 fuel oil, is that the asphaltene can comprise materials of substantially different characteristics, depending upon the source of petroleum and its treatment after withdrawal from its source. Thus, even within a given fuel shipment, the asphaltene can range from very small particles of brittle solids to small globules of a pitch-like substance. In any event, it has been found desirable to subject many asphaltene bearing oils to a much more severe shearing treatment than that disclosed in U.S. Pat. No. 4,479,805 to Batra. The apparatus herein described fills that need.

Thus, an apparatus appropriate for practicing the present method comprises a conduit which forms means to constrain the flow of oil and direct the flow of the oil against and through at least two spaced arrays of multi-bladed shearing elements which are fixed on a non-movable supporting shaft which is mounted axially within the conduit. Within each of the arrays, a number of shearing elements are mounted on the fixed shaft, usually about six elements per unit of shaft length, which unit is approximately equal to the diameter of the conduit. The blades of the shearing elements are slanted from a plane perpendicular to the length of the shaft and are arranged to be impacted by the asphaltene particles suspended in the flowing oil. Within each array, adjacent blade-bearing shearing elements are angularly offset from one another along the shaft and form wall sections defining helical paths. The wall sections have spaced openings between the blade elements, the spaced openings being generally V-shaped with the apex of the angle formed by the blades of each V-shaped opening pointing toward the shaft. At least one array has its shearing elements so arranged that the helical path thereof is counter-clockwise, and at least one other array has its elements so arranged that the helical path thereof is clockwise.

It is preferable to include additional pairs of spaced arrays of blade-bearing elements. Thus, in a preferred embodiment, at least one additional pair of spaced arrays is used. One of the additional arrays has its elements so arranged that the helical path is counterclockwise relative to the shaft and the other array has its blade-bearing elements so arranged that the helical path thereof is clockwise relative to the shaft.

In this application and accompanying drawings there is shown and described apparatus adapted to facilitate a preferred embodiment of the invention and suggested alternatives and modifications thereof, but it is to be understood that such are not intended to be exhaustive and that other alternatives and modifications may be made within the scope of the invention. The suggestions herein are selected and included for the purposes of illustration, in order that others skilled in the art will more fully understand the invention and the principles thereof, and will be able to modify the inventive method and embody it in a variety of forms, each as may be best suited to the conditions of a particular case.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
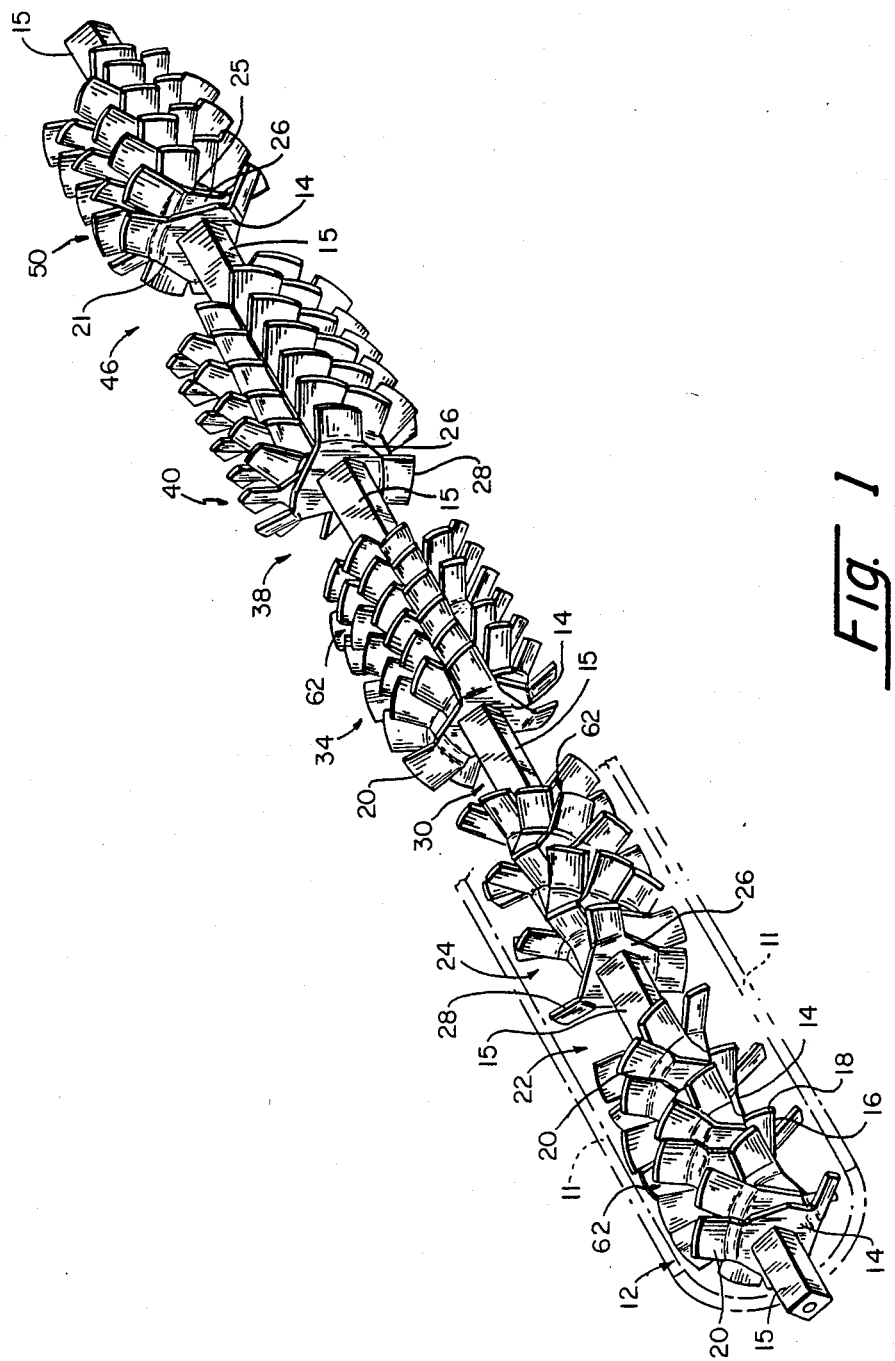
FIG. 1 is an exploded perspective view of an apparatus suitable for effecting the inventive process, showing in phantom a conduit, and asphaltene shearing arrays mounted in the conduit.
Figure 2:
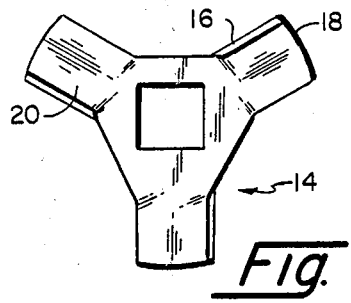
FIG. 2 is a plan view of a "right-bend" blade-bearing shearing element used in the apparatus of FIG. 1.
Figure 4:
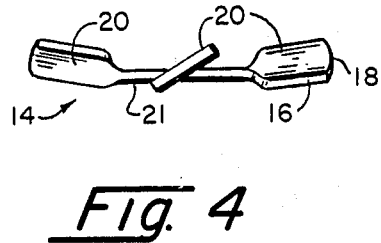
FIG. 4 is a side view of a typical "right-bend" blade-bearing shearing element useful with the invention.

Referring to FIG. 1, it will be seen that petroleum entering the conduit 11 encounters a first array 12 of right-bend blade-bearing shearing elements 14 mounted on a stationary conduit shaft 15 and will be directed in a generally helical clockwise path into the conduit. "Right-bend" shearing elements are illustrated in FIGS. 2 and 4. Lateral edges 16 and side edges 18 of blades 20 of the elements 14 tend to tear at the oil as it rushes past, acting to shear and tear apart asphaltene particles, or globules, which are carried in the oil. In practice, about a dozen blade-bearing elements 14 of about an inch in diameter are utilized of form this "right-bend" processing section, which serves as a flow-orientation zone, as described above.

Figure 3:
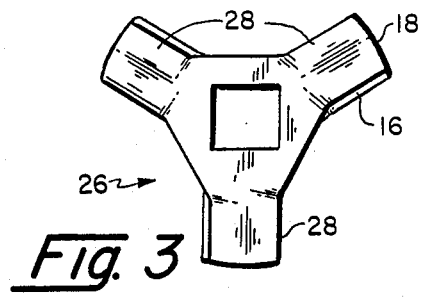
FIG. 3 is a plan view of a "left-bend" blade-bearing shearing element used in the apparatus of FIG. 1.
Figure 5:
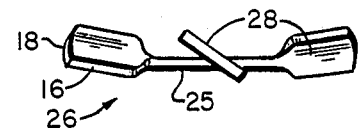
FIG. 5 is similar to FIG. 4, but shows a "left-bend" blade-bearing shearing element.
Figure 6:
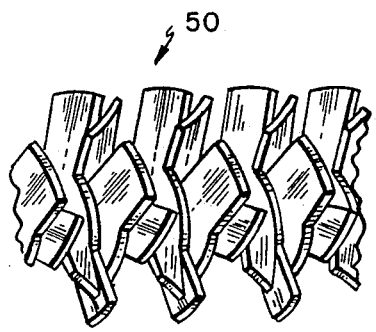
FIG. 6 is a perspective view of an array of blade-bearing shearing elements forming a zig-zag path between adjacent blades.
Figure 7:
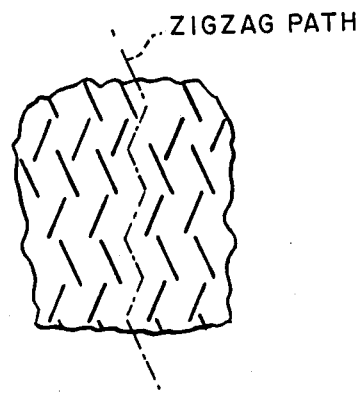
FIG. 7 is a diagram formed by inking the outer edges of the blade-bearing shearing elements of FIG. 6 and rolling them on a planar sheet of paper.

After the first array 12, there follows a space 22, in which there are no elements on the central shaft 15. Thereupon, the oil encounters a second array 24, which is similar to the first array 12, except that it is formed of "left-bend" shearing element 26 bearing blades 28 and, consequently forces a counter-clockwise helical flow of the oil. "Left-bend" shearing elements are illustrated in FIGS. 3 and 5. The second array 24 comprises a second flow-orientation zone, as described hereinabove.

Again, there is an open space 30, following the second array 24, before the oil encounters an additional array 34. The array 34 preferably includes twenty-two of the right-bend shearing elements 14 bearing blades 20 (FIGS. 2 and 4) each having a face 21 disposed similarly to the elements in the first array 12 of the first flow orientation zone. However, in the array 34, the elements 14 have been placed on the shaft 15 differently, i.e. in the array 34, the elements 14 are placed with the same side up but with blades 20 offset from each other to achieve closer packing. Thus, a more sharply pitched processing helix is formed and about twice as many blades are placed in an equivalent length of the array 34. The helical flow path of the fuel being processed is generally clockwise through the array 34, which constitutes a particle shear zone, as described hereinabove.

Next in the line of flow is a space 38 followed by an additional array 40 of compactly-spaced counterclockwise helical processing blade-bearing shearing elements of the "left-bend" type 26 bearing blades 28 and having the same relationship to the array 24 that the array 34 bears to the array 12.

Following the array 40 in the line of flow is a space 46 followed by a final array 50 having therein an arrangement of the blade-bearing shearing elements 14, 26 disposed on the central shaft 15 in an alternating manner; that is, a "right-bend" element 14 followed by a "left-bend" element 26, followed by another "right-bend" element, and so on. In this arrangement, the faces 21, 25 of the blade elements 14, 26 face leftwardly as viewed in FIG. 1. The array 50 provides a generally helical flow path. However, the centerline of the helical flow path follows a zig-zag course, providing a particularly severe treatment of the oil before it exits from the device. Moreover, a relatively high pressure drop through the array 50 provides a mechanism for fine-tuning the flow characteristics of a particular liquid by addition and removal of a number of the blade-bearing shearing elements of this array 50 from the shaft 15. The final array 50 serves as a baffled shear zone, as above described.

Thus, it is seen that fuel oil with globules of asphaltene therein, is constrained by the conduit 11 in such a way that it tends to follow helical flow paths formed by the blade-bearing shearing elements. Imperfect geometry of the blade, caused by a somewhat irregular offset of the shearing elements, causes and asphaltene to be more effectively impacted and comminuted by the edges 16 and 18 of the blades. V-shaped open spaces 62, (with the apex of the "V" being more remote from the interior of the wall than the mouth of the "V") between the blades accentuates this effect. The particular configuration of a given array determines the resistance to flow and shearing capability. An array, such as the array 50, with a zig-zag helical path, has particularly high shear capabilities. In general, it is desirable for the center line of a helical flow path to go through at least about ½ revolution per each unit length of an array which unit length is substantially equal to an average diameter of the conduit 11.

It has been observed that when heavy fuel oils, e.g. No. 6 and No. 10 oils, are processed in accordance with the above-described method, most asphaltene "particles" are reduced from their initial size, often 15 to 50 microns, to below 10 microns in average diameter. It has further been noted that the addition of water to the fuel oil prior to flowing the fuel oil through the conduit appears to provide some advantage in achieving good asphaltene comminution.

It is to be understood that the following claims are intended to cover all of the generic and specific features of the invention herein described and all statements of the scope of the invention which might be said to fall therebetween.

Having thus described my invention, what I claim as new and desire to secure by Letters Patent of the United States is:

1. A process for treating fuel oil having therein a substantial quantity of asphaltene, said process comprising the steps of
  (1) flowing said fuel oil through a conduit, said conduit having therein first array of first shearing elements, said first shearing elements being mounted along the interior of said conduit, said first sharing elements directing said flowing fuel oil into a first helical path,
  (2) flowing said fuel oil further through said conduit, said conduit having therein a second array of second shearing elements mounted along the interior of said conduit, said second shearing elements directing said flowing fuel oil into a second helical path generally counter to said first helical path,
  (3) flowing said fuel oil further through said conduit said conduit having therein additional arrays of shearing elements disposed serially along the length of said conduit, said additional arrays directing said flowing fuel oil through additional paths in alternating directions, and
  (4) maintaining said flowing of said fuel oil at a velocity across said first, second and additional shearing elements, thereby comminuting said asphaltene and dispersing said asphaltene within said fuel oil in a combustible form,
  (5) thereby substantially reducing quantities of particulates emanated upon burning of said fuel oil.

2. The process in accordance with claim 1, including flowing said fuel oil around a stationary central shaft on which are mounted said arrays of shearing elements.

3. The process in accordance with claim 1, including adding water to said fuel oil prior to flowing said fuel oil through said conduit.

4. The process in accordance with claim 1, including flowing said fuel oil further through said conduit, said conduit having therein a final array of shearing elements mounted along the interior of said conduit, said shearing elements of said final array directing said flowing fuel oil into a final generally helical flow path, a centerline of said final helical flow path following a zig-zag course, thereby effecting a particularly severe treatment of said fuel oil.

5. The process in accordance with claim 4, including flowing said fuel oil around a stationary central shaft on which are mounted said arrays of shearing elements.

6. The process in accordance with claim 4, including adding water to said fuel oil prior to flowing said fuel oil through said conduit.

7. A process for reducing the size of asphaltene particles in heavy fuel oils, the process comprising the steps of
  (1) flowing said fuel oil through a conduit, said conduit having therein a first array of first blade-bearing shearing elements mounted on a stationary shaft, first blade portions of said first elements shearing and tearing apart said asphaltene particles carried in said fuel oil, said first blade portions directing said flowing fuel oil into a first helical path,
  (2) flowing said fuel oil further through said conduit, said conduit having therein a second array of second blade-bearing shearing elements mounted on said stationary shaft, second blade portions of said second elements further shearing and tearing apart said asphaltene particles carried in said fuel oil; said second blade portions directing said flowing fuel oil into a second helical path counter to said first helical path,
  (3) flowing said fuel oil further through said conduit, said conduit having therein a third array comprising first blade-bearing shearing elements mounted on said stationary shaft, said third array having substantially twice as many of the first blade-bearing elements for a given length of said conduit as does said first array, first blade portions of said third array further shearing and tearing apart said asphaltene particles carried in said fuel oil, and first blade portions of said third array directing said flowing fuel oil into a third helical path counter to said second helical path, said oil undergoing substantially twice as many swirls for a given length of said conduit in said third array as in said first array, and (4) flowing said fuel oil further through said conduit, said conduit having therein a fourth array comprising second blade-bearing shearing elements mounted on said stationary shaft, said fourth array having substantially twice as many of the second blade-bearing elements for a given length of said conduit as does said second array, said second blade portions of said fourth array further shearing and tearing apart said asphaltene particles carried in said fuel oil, said second blade portions of said fourth array directing said flowing fuel oil into a fourth helical path counter to said third helical path, said oil undergoing substantially twice as many swirls for a given length of said conduit in said fourth array as in said second array.

8. The process in accordance with claim 7 and including the additional step of flowing said fuel oil further through said conduit, said conduit having therein a fifth array comprising first and second blade-bearing shearing elements mounted alternately on said stationary shaft, first and second blade portions of said fifth array severely shearing and tearing apart any remaining asphaltene particles carried in said fuel oil, and first and second blade portions of said fifth array directing said flowing oil into a fifth helical path.

9. The process in accordance with claim 8 in which a centerline of said fifth helical path follows a zig-zag course.

10. The process in accordance with claim 9, including causing said fuel oil to flow through one-half of a swirl in said fifth array for each unit of length of said fifth array substantially equal to the diameter of said conduit.

11. The process in accordance with claim 9, including adding water to said fuel oil prior to flowing said fuel oil through said conduit.

* * * * *